United States Patent [19]

Hulterstrum

[11] Patent Number: 5,060,967

[45] Date of Patent: Oct. 29, 1991

[54] COLLAPSIBLE MOBILITY DEVICE

[76] Inventor: Harold D. Hulterstrum, 1155 College Avenue, Baraboo, Wis. 53913

[21] Appl. No.: 586,238

[22] Filed: Sep. 21, 1990

[51] Int. Cl.[5] .................. B62B 7/06

[52] U.S. Cl. .................. 280/650; 280/42; 280/47.371; 280/47.4; 297/16; 297/331

[58] Field of Search .................. 280/37, 38, 39, 42, 280/647, 650, 656, 657, 658, 648, 47.34, 47.371, 47.38, 47.4; 297/16, 331; 272/70.3, 70.4

[56] References Cited

U.S. PATENT DOCUMENTS

| | | | |
|---|---|---|---|
| 2,774,605 | 12/1956 | Schladebach | 280/62 X |
| 2,866,495 | 12/1958 | Diehl et al. | 297/6 |
| 2,896,693 | 7/1959 | Schladebach | 280/62 X |
| 4,229,039 | 10/1980 | Day | 280/650 X |
| 4,239,248 | 12/1980 | Ewers | 280/42 |
| 4,341,381 | 7/1982 | Norberg | 272/70.4 |
| 4,461,471 | 7/1984 | Brastow | 272/70.3 |
| 4,640,525 | 2/1987 | Jensen et al. | 280/650 X |
| 4,643,211 | 2/1987 | Morris | 135/67 |

*Primary Examiner*—Andres Kashnikow
*Assistant Examiner*—Michael Mar
*Attorney, Agent, or Firm*—Allegretti & Witcoff, Ltd.

[57] ABSTRACT

A collapsible mobility device is comprised of a base with a vertical support and a seat, all supported on wheels. The base is capable of being folded in upon itself. The vertical support is capable of being extended and retracted. The seat can be pivoted in an upward position. The wheels can be locked in various positions so that the device is capable of serving as a stool, a swivel chair, a wheelchair, a luggage rack, a walker and a wheeled cane. Ultimately the entire device can be collapsed to a size such that it can be stored in an overhead bin or under the seat of a commercial aircraft or other common carrier.

11 Claims, 3 Drawing Sheets

Fig. 8
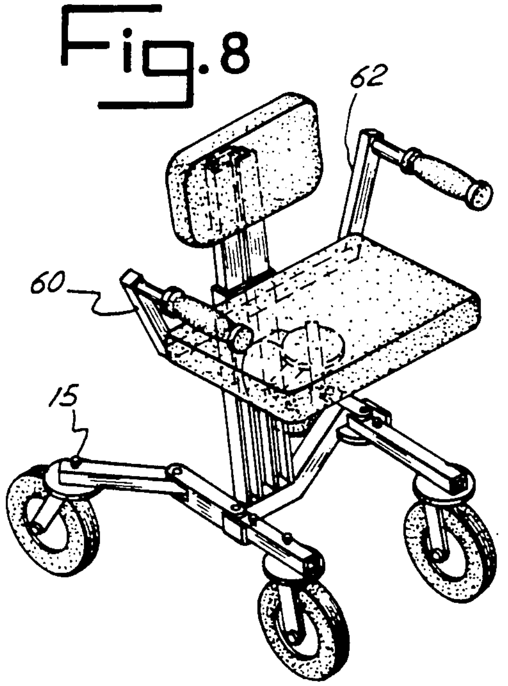
Fig. 9
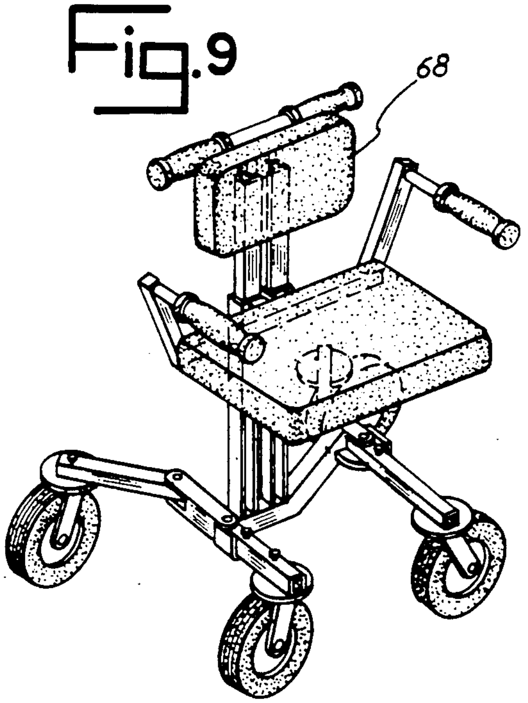
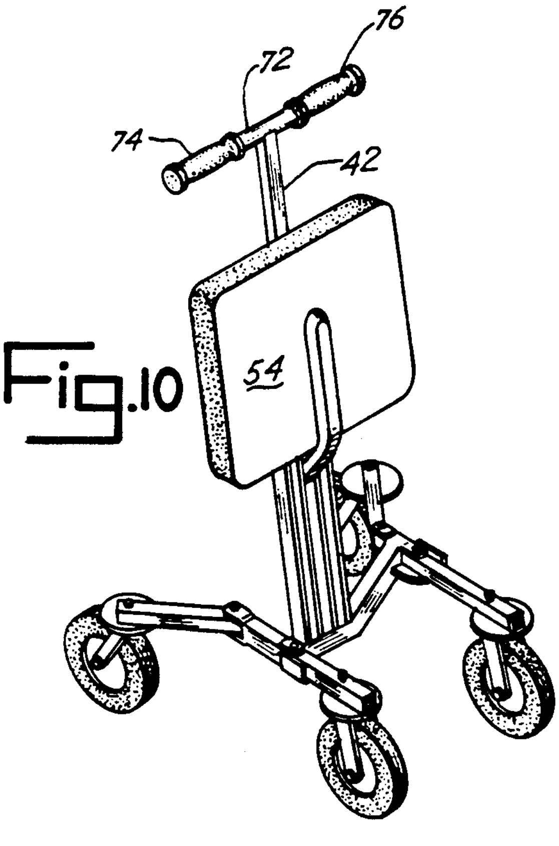
Fig. 10
Fig. 11
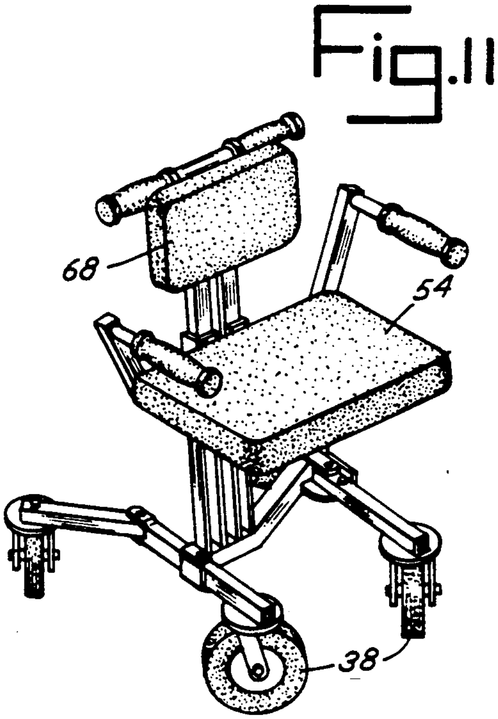

COLLAPSIBLE MOBILITY DEVICE

BACKGROUND OF THE INVENTION

A. Field of the Invention

The present invention relates to a collapsible mobility device for persons with partially paralyzed legs. It is designed specifically to enable persons with limited or failing use of their lower extremities to remain active. The present invention is meant to be an escape from being confined to a wheelchair. The collapsible mobility device of the present invention incorporates numerous features not found in the prior art, most notably the versatility of the device to be used to perform different functions and the extreme compactness of the device in its collapsed configuration, which allows the device to be stored in an overhead bin or under the seat of a commercial aircraft or other common carrier.

B. Description of the Prior Art

Collapsible mobility devices are not new, and are in fact well known in the art. Various shapes and sizes of such devices have been in use for many years. However, for any such device to be of any practical use, the device must be capable of serving a multitude of functions such as a chair, a walker, a cane, a stool, a wheelchair and a luggage cart. In light of today's extremely mobile society, one who has limited use of his/her lower extremities and desires mobility and independence must be able to rely on a single device which can perform all of the above functions, if not more.

One drawback of the current collapsible mobility devices is their limited ability to perform in more than one functional capacity. Many of the collapsible mobility devices in the prior art designed to perform a single function. For example, U.S. Pat. No. 4,461,471 shows a collapsible mobility device that is designed to be used only as a walker. Likewise, U.S. Pat. No. 4,341,381 discloses a device that was also designed to perform mainly as a walker and nothing else.

There also exist other collapsible mobility devices in the prior art that, although they are capable of performing more than one function, still prove to be unacceptable for numerous reasons. See for examples, U.S. Pat. Nos. 2,866,495, 4,239,248 and 4,643,211. The above three collapsible mobility devices are capable of serving as both a walker and a chair; however, beyond that their use is limited. When the above devices are collapsed, the resulting structure is still too large and/or heavy for easy portability and storage. Hence, anyone attempting to take advantage of any of the above prior art devices would find themselves extremely confined.

Due to the readily apparent drawbacks of the current collapsible mobility devices, a tyical user would be forced to alternate between devices depending on the function required by the user.

For these and other reasons, the collapsible mobility devices of the prior art are not satisfactory. There currently exists a need for a collapsible device having greater flexibility of functional use, being more compact in size and lighter in weight without sacrificing stability, and capable of collapsing to such a size as to be able to be stored in overhead bin or under a seat of a commercial aircraft or other common carrier. Only with such a device can a person with limited or failing use of their lower extremities remain active and truly independent.

SUMMARY OF THE INVENTION

Therefore, it is an object of the present invention to decrease the weight and collapsed size of a collapsible mobility device while at the same increasing the functional capacity of the same.

Another object of the present invention is to provide an improved multifunctional mobility device for persons with limited or failing use of their lower extremities, so that such persons will be able to stay completely mobile, needing only to rely on a single device to accomplish all their mobility requirements.

The present invention provides a collapsible mobility device that is relatively lightweight, compact for storage in an overhead bin or under the seat of an airplane and is capable of serving a multitude of functional uses for the user. More specifically, the collapsible mobility device of the present invention includes a base mounted on wheels, Mounted above the base is a support means and a seat for the occupant. The base is designed in such a way that numerous configurations of the base and the wheels are possible. Additionally, the entire device is designed in such a way that the occupant has his/her choice of numerous overall configurations depending upon the task to be accomplished, e.g., stool, chair, walker, cane, swivel chair or luggage cart. A further advantage of the present invention is the collapsible feature incorporated into its design. The device of the present invention is capable of being collapsed to the dimensions of 18"×8"×14", so as to allow it to be stored in an overhead bin or under the seat of a commercial aircraft or other common carrier. Such an advantage allows the occupant complete freedom of movement and no longer requires that the occupant seek assistance in boarding or disembarking a commercial aircraft or other common carrier.

A more complete understanding of the present invention and an appreciation of the features, aspects and advantages contained in the present invention will be clear upon a review of the following detailed description.

BRIEF DESCRIPTION OF THE DRAWINGS

There is shown in the attached drawings a presently preferred embodiment of the present invention wherein like numerals refer to like elements in the various views and wherein:

FIG. 8 is a left front perspective view of the collapsible mobility device, illustrating the device in the configuration of an office chair;

FIG. 9 is a left front perspective view of the collapsible mobility device, illustrating the device in the configuration of a stool;

FIG. 10 is a left front perspective view of the collapsible mobility device, illustrating the device in the configurations of a luggage cart and a walker; and FIG. 11 is a left front perspective view of the collapsible mobility device, illustrating the device in the configuration of a swivel chair.

DESCRIPTION OF PREFERRED EMBODIMENT

Figure 1:
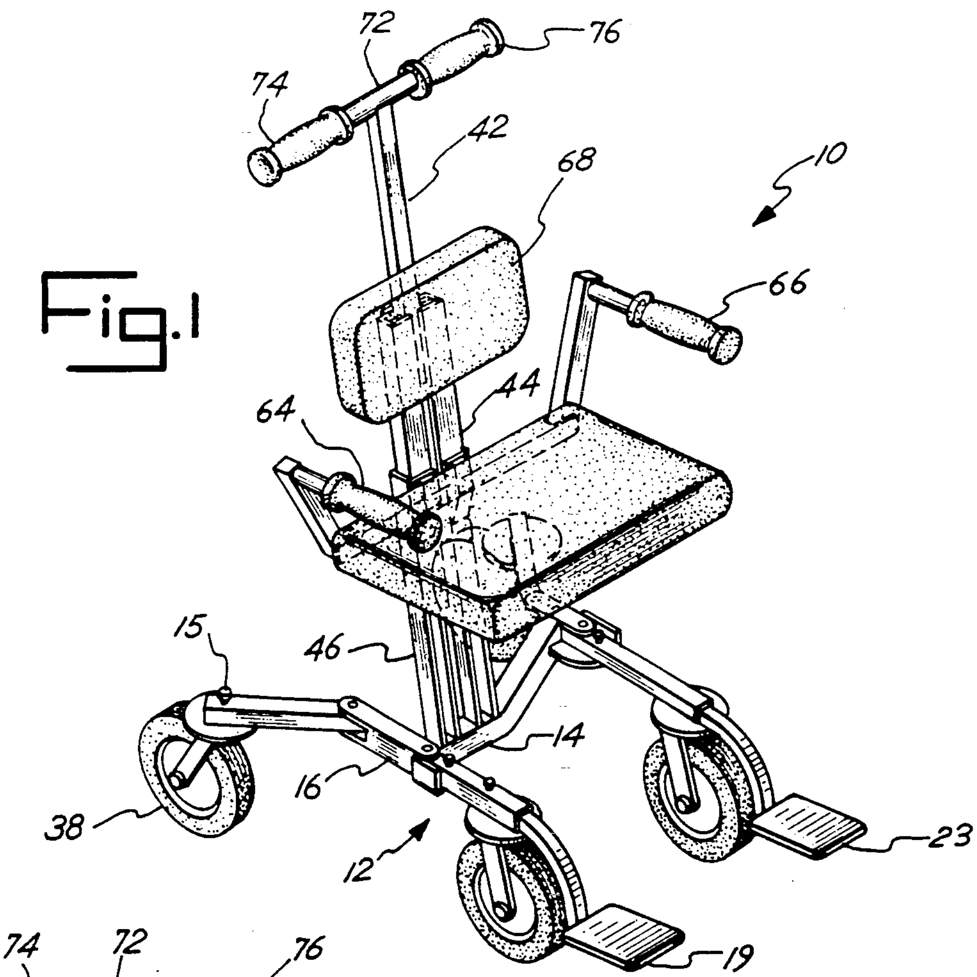
FIG. 1 is a left front perspective view of a preferred embodiment of a collapsible mobility device in accordance with the present invention.
Figure 2:
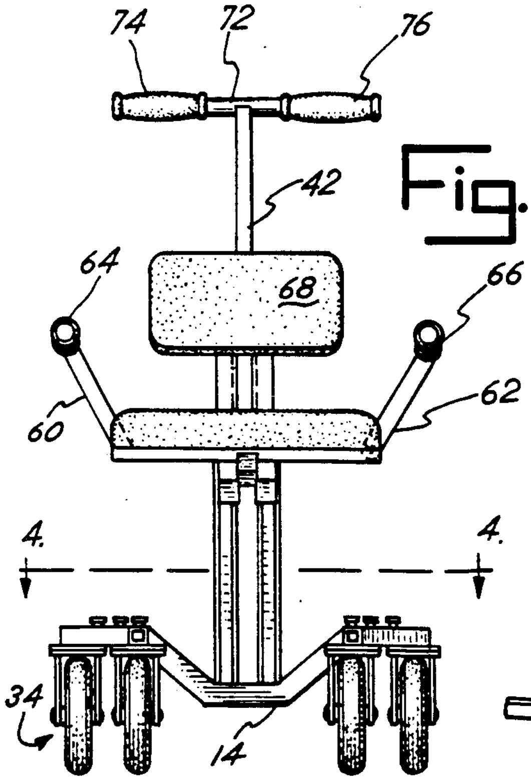
FIG. 2 is a front elevation view of the collapsible mobility device.
Figure 3:
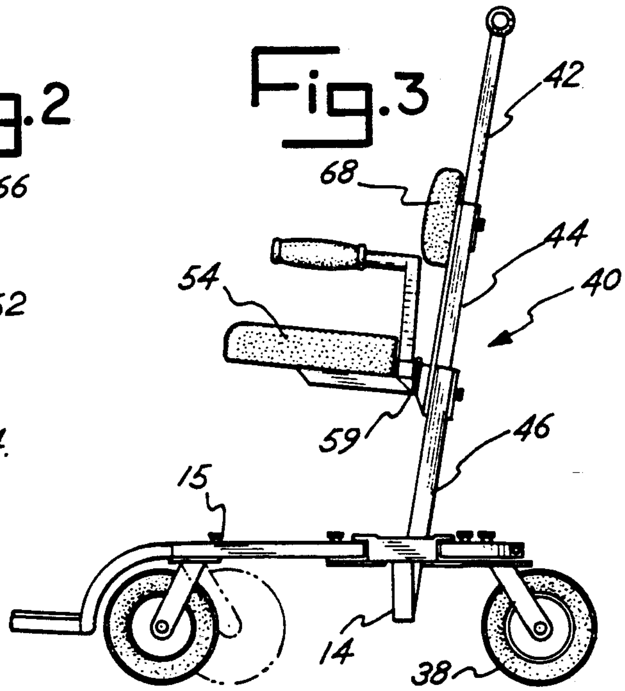
FIG. 3 is a right side view of the collapsible mobility device, showing a footrest in place.

Referring now to the drawings, FIGS. 1, 2 and 3 illustrate the preferred embodiment of the collapsible mobility device 10 of the present invention in left front, front and right side views, respectively. Generally, the collapsible mobility device 10 includes a base 12 which is made up of a main link 14, a left front link 18, a left rear link 20, a right front link 22 and a right rear link 24. Positioned below the underside of the base 12 are index plates 36 to which the wheels 38 are secured. The index plates 36 are fixedly attached to each wheel 38 assembly. The index plates 36 contain index marks which allow each index plate 36 to be rotated upon its vertical axis to numerous positions. Such positioning of the index plates 36 is accomplished through the use of a locking pin which engages various openings in the index plates 36. The only exception to this arrangement concerns the index plates 36 which are located at either end of the main link 14, where the index plates are permanently fixed to each end of a T-shaped member 16. Operatively connected to the index plates 36 at each end of the T-shaped member 16, are the left side links 18, 20 and the right side links 22, 24. The index plates 36 located at either end of the T-shaped member 16, are welded or otherwise perrmanently fixed to the T-shaped member 16, and are thus incapable of any rotational movement. The base 12 is constructed in such a way that the left side links 18, 20 and right the side links 22, 24 are capable of being quickly and easily changed between various positions.

Figure 4:
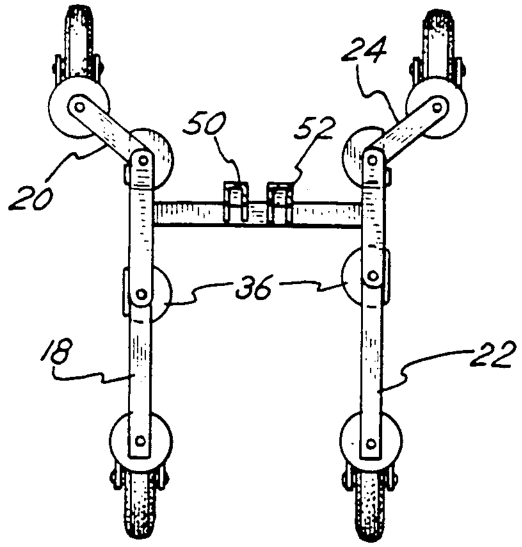
FIG. 4 is a partially sectioned top view of the collapsible mobility device in a setup position.

FIGS. 1 and 4 illustrate the collapsible mobility device 10 with the left rear link 20 and the right rear link 24 extended beyond the width of the main link 14. However, if one needed a device of extreme narrowness (such as the 16"aisle width of a 727-200 aircraft), the left rear link 20 and the right rear link 24 are capable of being locked in a position perpendicular to the main link 14 and parallel to each other, thereby creating a collapsible mobility device with a width of 14", a width quite acceptable in evern the tightest of quarters. The individual links are constructed out of chrome-moly steel tubing, the tubing being generally square in cross-section. However, one could also fabricate the links out of lightweight aircraft structural aluminum, and the tubing could prove just as useful if it were shaped round. The main link 14 which runs from the left side link 18 to the right side link 22 is of unitary construction.

Almost all attachments in the present invention are accomplished through the use of a standard spring loaded locking pin 15, although a standard type rachet assembly could also be utilized. Many of such pins are clearly visible in FIGS. 2 and 3. A locking pin 15 is held in its closed position by the use of a spring and can be opened by a simple pull on the head of the locking pin 15. In its closed position, a locking pin 15 seats into an opening (not shown) in one of the circular wheel plates 36 or in pre-drilled openings in the chrome-moly steel tubing. In this way, the seat 54 and backrest 68 of the present invention can be raised or lowered and the four wheels 38 can be locked in various positions. However, the main reason behind the locking pins 15 is to allow the device to be fully collapsed to such a minimum size as to be storable under the seat or in an overhead bin of a commercial aircraft or other common carrier and to allow numerous functional configurations of the device of the present invention. By altering the locking pins 15 into the various locations as depicted by the preferred embodiment, the collapsible mobility device is capable of being collapsed to the size of 18"×8"×14". In addition, because of the materials used in its construction, the collapsible mobility device 10 weighs in at a mere 25 lbs, thereby making it very manageable and usable. It should be noted that the 25 lb weight of the collapsible mobility device 10 is consistent with chrome-moly steel tubing construction; however, the weight of the collapsible mobility device 10 could be substantially lessened if tubing of aluminum or some other lightweight composite material were to be utilized.

By viewing FIGS. 1 and 3, one can also see that a left footrest 19 and a right footrest 23 can be inserted into the front end of the left front link 18 and the right front link 22 if such footrests are deemed necessary. The left footrest 19 and the right footrest 23 are held in place by the use of a standard spring loaded push button type device (not shown).

The various positions of the wheels 38 mentioned above can be clearly seen in FIGS. 8, 9 and 11. In FIG. 8, the wheels 38 are locked in a forward position which would most likely be utilized if the collapsible mobility device were to be used as an office chair. If the collapsible mobility device were to be utilized as a walker, it would be most advantageous to lock the rear wheel in a front to back position and allow the front wheels to rotate freely. By the same token, if the collapsible mobility device were to be utilized as a wheel chair, it would be most advantageous to lock the front wheels in a front to back position and allow the rear wheels to rotate freely. FIG. 9 illustrates the wheels 38 locked in a side to side position, a position which could prove especially helpful if the person utilizing the collapsible mobility device were an employee in an assembly line situation or in some other situation where side to side track movement was necessary. And finally, FIG. 11 illustrates the wheels 38 locked in a swivel position, a position which could be used if the occupant of the collapsible mobility device needed to have continued access to items both in front of and behind him/her.

Figure 6:
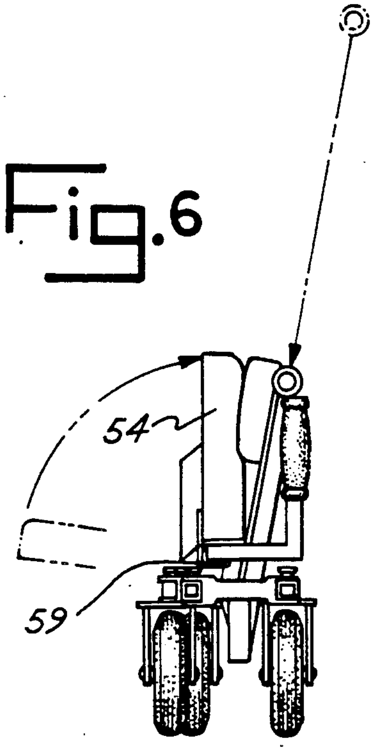
FIG. 6 is a right side view of the collapsible mobility device in a collapsed position.
Figure 7:
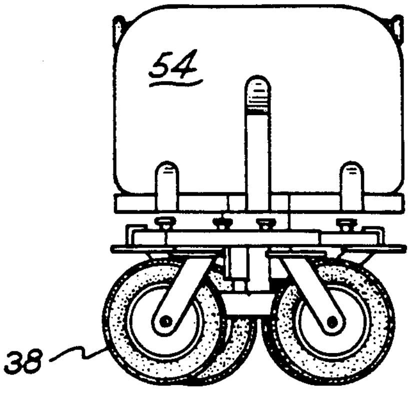
FIG. 7 is a front elevation view of the collapsible mobility device in a collapsed position.

Although FIGS. 1, 2 and 3 all illustrate the support means 40, FIG. 1 serves as the best illustration. The support means 40 is comprised of a mast 42, a mast casing 44 and a mast housing 46. The mast housing 46, which is comprised of two pieces of square tubing, is welded or otherwise permanently fixed to the upper side of the main link 14 in a substantially vertical position. The mast 42 is complimentary in shape and fits within the center channel 48 of the mast casing 44 and the mast casing 44 is complimentary in shape and fits between the left 50 and right 52 tubing sections of the mast housing 46. The mast casing 44 is comprised of two pieces of standard angle iron, interconnectedly joined towards their upper end. At its upper end, the mast casing 44 is fixedly attached to the rear of the backrest 68. By such a design, the support means 40 is fully extendable as shown in FIGS. 2 and 3, and fully retractable as shown in FIGS. 6 and 7. The spring loaded push buttons previously discussed are also utilized to lock the mast 42 in its various extended and retracted positions within the mast casing 44.

Figure 5:
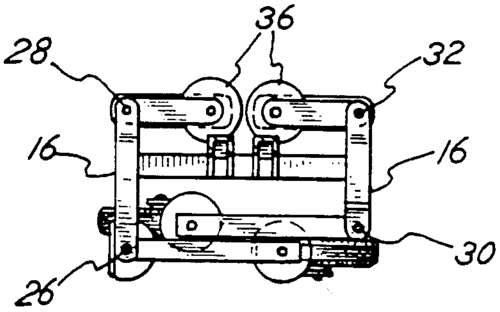
FIG. 5 is a partially sectioned top view of the collapsible mobility device in a collapsed position.

To get an idea of what role the locking pins 15 play in the collapsibility of the present invention, one need only look to FIGS. 4 and 5. FIGS. 4 and 5 are top section views of the present invention, with FIG. 4 in the set-up position and FIG. 5 in the collapsed position. It can be readily seen that the number and location of the locking pins 15 is critical to the overall collapsibility of the present invention.

Fixedly secured to the top of the mast 42 in a horizontal side to side position is the handle 72 which is encased at each end by the left upper grip 74 and the right upper grip 76. The upper grips 74, 76 are of the type commonly found on a bicycle and the like. The grip encased handle 72 is important to the function of the present invention for many reasons. It first serves as a grip to extend the support means 40 from its colapsed position to its extended position. Second it serves as a support when the present invention is being utilized as a walker or a wheeled cane. And finally, the handle 72 provides a means by which to grasp and move the present invention when it is in its collapsed configuration.

As can be further seen from FIGS. 1, 2 and 3, the preferred embodiment of the present invention contains a backrest 68 and a seat 54. The backrest 68 is fixedly attached to the mast casing 44. The seat 54 is hingedly attached to the mast casing 44 by the use of a hinge 59 so that the seat 54 can be utilized by the user as is shown in FIGS. 1, 2, 3, 8, 9 and 11 or, so that the seat 54 can be pivoted upward as shown in FIG. 10. The seat 54 can also be removed from the collapsible mobility device simply by removing the hinge pin of hinge 59. FIGS. 6 and 7 illustrate the seat 54 and the present invention as a whole in its fully collapsed configuration. The height of the backrest 68 and the seat 54 can be adjusted by disengaging a standard type clamp device (not shown) and then raising or lowering the seat 54 and backrest 68 assembly.

Operatively connected to the rear corners of the seat 54 are the left pivot arm 60 and the right pivot arem 62. Although the preferred embodiment illustrates the pivot arms 60, 62 operatively connected to the rear corners of the seat 54, it would be obvious to one skilled in the art to connect the same in some other similar manner, such as connecting the pivot arms 60, 62 to the mast casing 44. The L-shaped pivot arms 60, 62 also are encased on each free end with grip similar to those on each end of the handle 72. The pivot arms 60, 62 and the lower grips 64, 66 provide support for the user in situations where the present invention is used as some variation of a chair as illustrated in FIGS. 1, 2, 3, 8, 9 and 11. Just as with the seat 54, the pivot arms 60, 62 are fully and quickly removable from the collapsible mobility device in situations where their presence is not deemed necessary by removal of the seat 54 to which the pivot arms 60, 62 are attached.

Not shown in the eenclosed drawings, but nonetheless an important feature of the present invention, is braking equipment. Certain models of the collapsible mobility device are equipped with standard type bicycle brakes. The brake handle is mounted upon the handle 72 with the actual brakes mounted to restrain the rear wheels 38 of the present invention. Experience has shown that braking capacity of the collapsible mobility device 10 proves especially helpful in situations of uneven terrain or in situations where the surface beneath the user is in motion (such as the deck of a cruise ship).

To fully collapse the present invention, the right front link 22 is folded inward upon the main link 14 at the right front pivot point 30. The left front link 18 is then folded inward upon the main link 14 at the left front pivot point 26. At that point, the left rear link 20 and the right rear link 24 are folded inward upon the main link 14 at the left rear pivot point 28 and the right rear pivot point 32 respectively. The seat 54 is then pivoted upward as illustrated in FIG. 10. The seat 54, backrest 68 and support means 40 are then lowered to their collapsed position as illustrated in FIG. 6. And finally, the pivot arms 60, 62 are pivoted rearward as is also illustrated in FIG. 6. All of the above is accomplished through the disengagement and reengagement of the locking pins 15 and the clamp device. When completely collapsed, the preferred embodiment of the present invention measures 18″×8″×14″, and is illustrated from the front by FIG. 7.

The collapsible mobility device 10 of the present invention also has one additional feature. Do to its compact size, the collapsible mobility device 10 can be stored in a small closet as a whole. By simply collapsing in only the front and rear, left and right links 18, 20, 22 and 24, the collapsiable mobility device can be stored in a closet without going to the touble of a complete collapsing procedure. The collapsible mobility device 10 is then ready for its next use in a matter of seconds.

While a presently preferred embodiment of the invention has been shown and described, it is apparent that various changes and modifications may be made therein without departing from the invention. Therefore, it is intended to cover in the appended claims, all such changes and modifications as fall within the true spirit and scope of the invention.

What is claimed is:

1. A collapsible mobility device for handicapped persons, comprising, in combination: a base, said base comprising a main link having a transverse portion and left and right longitudinal side portions fixedly connected to opposite ends of said transverse portion, a pair of left side links pivotally connected, at their inner ends for independent movement about substantially vertical axes, to respective ends of said left side portion, a pair of right side links pivotally connected, at their inner ends for independent movement about substantially vertical axes, to respective ends of said right side portion, a wheel secured to an outer end of each of said left and right side links, and means for locking each of said left and right side links in selected ones of a plurality of extended, use position relative to said main link or a collapsed, stored position with said left and right side links lying substantially parallel to said transverse portion of said main link;

support means fixedly secured to an upper side of said base in a substantially vertical position, said support means being elongated and collapsible;

gripping means secured to an upper end of said support means; and a seat attached to said support means, said seat being movable between an extended, use position and a collapsed, stored position.

2. A collapsible mobility device as claimed in claim 1 wherein said device includes index plates, said wheels being fixedly connected to said index plates and said index plates being operatively secured to the underside of said base, said wheels being able to swivel and also being lockable in predetermined configurations, whereby movement of the collapsible mobility device can be restricted to certain directions.

3. A collapsible mobility device as claimed in claim 1 wherein said device includes a backrest, said backrest being fixedly secured to said support means and said seat being pivotally secured to said support means, said backrest and said seat being capable of height adjustment along said support means, whereby said seat can be pivoted from a substantially horizontal, extended use position to an upward, collapsed, stored position, said collapsible mobility device being a carrier of luggage in one configuration and said collapsible mobility device also being fully collapsible for storage in an overhead bin or under the seat of a commercial aircraft.

4. A collapsible mobility device as claimed in claim 1 wherein said gripping means is comprised of an upper grip and a lower grip, said upper grip being fixedly secured to said support means in a substantially horizontal orientation, whereby said upper grip can be utilized as a support for the user, as means for extending and retracting said support means, and as means for maneuvering said collapsible mobility device.

5. A collapsible mobility device as claimed in 4 wherein said lower grip is pivotally connected to the rear of said seat, wherein said lower grip has both an open and a closed position, whereby said lower grip in the open position is a support for the user, and whereby said lower grip in the closed position can be integrated into said collapsible mobility device in said collapsed, stored position for storage in an overhead bin or under a seat of a commercial aircraft.

6. A collapsible mobility device as claimed in claim 1 wherein, with said base in the extended, use position, said pivoted to the extended, use position, said lower grip in the open position, said support means in the extended orientation, and said wheels locked in a front to back position, said collapsible mobility device is an office chair for the user.

7. A collapsible mobility device as claimed in claim 1 wherein, with said base in the extended, use position, said seat pivoted to the extended, use position, said lower grip in the open position, said support means in the extended orientation, and said wheels locked in a side position, said collapsible mobility device is a stool for the user.

8. A collapsible mobility device as claimed in claim 1 wherein, with said base in the extended, use position, said seat pivoted to the extended, use position, said lower grip in the open position, said support means in the extended orientation, and said wheels locked in a circular position, said collapsible mobility device is a swivel chair for the user.

9. A collapsible mobility device as claimed in claim 1 wherein, with said base in the extended, use position, said seat pivoted to the extended, use position, said lower grip in the open position, said support means in the extended orientation, said front wheels locked in a front to back position, said rear wheels allowed to freely swivel, and said footrests being added to said base, said collapsible mobility device is a wheelchair for the user.

10. A collapsible mobility device as claimed in claim 1 wherein, with said base in the extended, use position, said seat pivoted to the collapsed, stored position, said lower grip in the closed position, said support means in the extended orientation, said back wheels locked in a front to back position, and said front wheels allowed to freely swivel, said collapsible mobility device is a walker or a luggage cart for the user.

11. A collapsible mobility device as claimed in claim 1 wherein, with said base in the collapsed, stored position, said lower grip in the closed position, said seat pivoted to the collapsed, stored orientation and adjusted to its lowest position, said backest also adjusted to its lowest position, said wheels locked in a front to back position, and said support means in an extended orientation, said collapsible mobility device is a wheeled cane for the user.

* * * * *